US006723301B2

(12) United States Patent
Rouleau et al.

(10) Patent No.: US 6,723,301 B2
(45) Date of Patent: Apr. 20, 2004

(54) EUO-STRUCTURAL-TYPE ZEOLITE WITH A LOW SI/AL RATIO AND ITS USE AS CATALYST FOR ISOMERIZATION OF C8-AROMATIC FRACTIONS

(75) Inventors: Loïc Rouleau, Oullins (FR); Frédéric Kolenda, Chaponost (FR); Elisabeth Merlen, Rueil-Malmaison (FR); Fabio Alario, Neuilly sur Seine (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 352 days.

(21) Appl. No.: 09/849,519

(22) Filed: May 7, 2001

(65) Prior Publication Data

US 2001/0056032 A1 Dec. 27, 2001

Related U.S. Application Data

(60) Provisional application No. 60/209,193, filed on Jun. 5, 2000.

(30) Foreign Application Priority Data

May 5, 2000 (FR) ............................................. 00 05797

(51) Int. Cl.$^7$ ............................................... C01C 39/48
(52) U.S. Cl. .............................. 423/706; 423/DIG. 36; 502/60
(58) Field of Search ................................ 423/706, 700, 423/DIG. 36; 502/60

(56) References Cited

U.S. PATENT DOCUMENTS

| 4,537,754 | A | | 8/1985 | Casci et al. ................. 423/277 |
| 4,695,667 | A | | 9/1987 | Sumitani et al. ............. 585/481 |
| 6,514,479 | B1 | * | 2/2003 | Merlen et al. .............. 423/705 |
| 2001/0051757 | A1 | * | 12/2001 | Rouleau et al. ............. 585/481 |

FOREIGN PATENT DOCUMENTS

EP          0 159 845 A2     10/1985

\* cited by examiner

*Primary Examiner*—David Sample
(74) *Attorney, Agent, or Firm*—Millen, White, Zelano & Branigan, P.C.

(57) ABSTRACT

This invention relates to an EUO-structural-type zeolite that comprises at least one element X that is selected from among silicon and germanium and at least one element T that is selected from among aluminum, iron, gallium, boron, titanium, vanadium, zirconium, molybdenum, arsenic, antimony, chromium and manganese. The zeolite of the invention has an X/T ratio of between 5 and 50 and an N/T ratio of between 0.010 and 0.065. This invention also relates to the use of the EUO zeolite as a catalyst in a process for conversion of hydrocarbon feedstocks and more particularly in a process for isomerization of aromatic compounds with 8 carbon atoms per molecule.

28 Claims, No Drawings

EUO-STRUCTURAL-TYPE ZEOLITE WITH A LOW SI/AL RATIO AND ITS USE AS CATALYST FOR ISOMERIZATION OF C8-AROMATIC FRACTIONS

CROSS REFERENCE TO RELATED APPLICATION

This application claims the benefit under 35 U.S.C. 119(e) of provisional application 60/209,193 filed Jun. 5, 2000.

TECHNICAL FIELD

This invention relates to a new EUO-structural-type zeolite that has a specific chemical composition of its crystalline framework and a specific nitrogen ratio. The invention also relates to the use of the zeolite as a catalyst in the main processes for transformation of hydrocarbons that uses the refining of petroleum and petrochemistry. It is used in particular in the processes for isomerization of aromatic compounds with 8 carbon atoms that are also called "C8-aromatic fractions."

PRIOR ART

The isomerization of xylenes of ethylbenzene or a mixture of xylenes and ethylbenzene requires the presence of an acid function and a metal of group VIII. The main purpose of the isomerization of the C8-aromatic fractions is to produce the paraxylene that is the most desired isomer because of its application particularly in the textile industry. The isomerization reaction of the C8-aromatic compounds leads to parasitic reactions that result from the opening of naphthene rings that may or may not be followed by cracking or else reactions of dismutation and/or transalkylation of the C8 aromatic compounds that generate undesirable aromatic compounds.

Catalysts for isomerization of aromatic compounds with 8 carbon atoms were already described. U.S. Pat. No. 4,723,051 and U.S. Pat. No. 4,665,258 describe, for example, optimized formulations with a mordenite zeolite base and a metal of group VIII, but they result in catalysts with which the parasitic reactions are non-negligible. These catalysts lack selectivity of paraxylene in favor of the above-mentioned parasitic reactions that constitute net losses for the desired isomerization reaction.

Other works have shown that the EUO-structural-type zeolites have improved catalytic performance levels, in particular in terms of activity, when said zeolites are used as a catalyst in the isomerization reactions of C8-aromatic fractions. In particular, European Patent Application EP-A-0 923 987 of the applicant relates to catalysts that are prepared with an EUO-structural-type zeolite that has good dispersion and good mechanical resistance of the metal of group VIII and that provide good selectivities.

The EUO-structural-type zeolites are described in the prior art (W. M. Meier and D. H. Olson, "Atlas of Zeolites Structure Types," 4th Edition, 1996) and have a monodimensional microporous network, whose diameter of the pores is 4.1×5.7 Å (1 Å=1 angstrom=$1.10^{-10}$ m) N. A. Briscoe et al. taught that these monodimensional channels have lateral pockets with a depth of 8.1 Å and a diameter of 6.8×5.8 Å (zeolites, 8, 74, 1988).

The EUO-structural-type zeolites comprise the EU-1 zeolite, the TPZ-3 zeolite, and the ZSM-50 zeolite and generally have the following formula in anhydrous form: 0-100 $XO_2$: 0-10 $T_2O_3$: 0-20 $R_{2/n}O$: where R represents a cation of valence n, X represents silicon and/or germanium, T represents at least one element that is selected from among aluminum, iron, gallium, boron, titanium, vanadium, zirconium, molybdenum, arsenic, antimony, chromium and manganese.

In general, the methods for preparation of EUO-structural-type zeolites comprise the mixing in aqueous medium of a source of an element X, a source of an element T, a source of an alkaline metal and a nitrogen-containing organic compound that acts as a structuring agent.

The EU-1 zeolite, described in European Patent Application EP-A-0 042 226, is prepared by using as a structuring agent either the alkylated derivative of an α-ω diammonium polymethylene or a degradation product of said derivative or else precursors of said derivative, whereby the structuring agent is found after synthesis in the intracrystalline pores of said zeolite (A. Moini et al, Zeolites, 14, 1994). This EU-1 zeolite preferably has an X/T ratio of between 5 and 75.

The TPZ-3 zeolite, described in European Patent Application EP-A-0 051 318, is prepared by using the same structuring agent family as the one that is employed for synthesizing the EU-1 zeolite. In particular, the use of the compound 1,6-N,N,N,N',N',N'-hexamethylhexamethylene diammonium is described. This TPZ-3 zeolite preferably has an X/T ratio of between 10 and 125.

The synthesis processes that use an alkylated derivative of an α-ω ammonium polymethylene as a nitrogen-containing organic compound result in obtaining zeolites, after synthesis, that generally have an N/Si ratio that is greater than 0.07.

The ZSM-50 zeolite, described in documents EP 0 159 845 and U.S. Pat. No. 4,640,829, is prepared by using as a structuring agent the dibenzyldimethylammonium derivative (DBDMA), which is contained in the intracrystalline pores of said zeolite (A. Thangaraj et al., Zeolites, 11, 1991). This zeolite has an X/T ratio that is greater than 50.

The EUO-structural-type zeolites differ essentially by the nature of the nitrogen-containing organic structuring agent that is present in the solid, after synthesis, and therefore by their respective N/T ratio.

Thus, an EUO zeolite that is obtained with the DBDMA derivative is distinguished essentially, after synthesis, from the EUO zeolites that are synthesized with the α-ω diammonium polymethylene compounds, by the nature of the cation that is present in the intracrystalline pores. It is also known in the literature that the structure of an EUO zeolite, obtained with DBDMA, differs from that of an EUO zeolite that is obtained with the α-ω diammonium polymethylene compounds by the arrangement of aluminum atoms within the crystalline network (W. Souverijns et al., Microporous Materials, 4, 123–130, 1995).

Whereas the family of structuring agents used for synthesizing the EU-1 and TPZ-3 zeolites seems to promote obtaining zeolites with a low Si/Al ratio, structuring agents such as the DBDMA promote obtaining zeolites with a high Si/Al ratio. Thus, U.S. Pat. No. 4,640,829 describes a method for preparation of a zeolite that has an Si/Al ratio that is greater than 125 and teaches that DBDMA is particularly effective for promoting nucleation and the growth of crystals of ZSM-50 zeolites that have a high Si/Al ratio. It is also reported that with an Si/Al ratio that is less than 125, the product that is obtained for the most part does not contain the ZSM-50 zeolite. Likewise, Rao et al. (Zeolites, 9, 483–490, 1989) described the synthesis of an EUO-structural-type zeolite with a mixture of benzyldimethylamine and benzyl chloride, precursors of dibenzyldimethylammonium chloride, whereby the zeolite that is obtained has a crystallinity rate that is better, the higher the SiAl ratio. Rao further teaches that for numerous catalytic applications, it is preferable to use zeolites that have a high Si/Al ratio.

SUMMARY OF THE INVENTION

This invention is based on the discovery of a new EUO-structural-type zeolite that comprises at least one element X that is selected from among silicon and germanium and at least one element T that is selected from among aluminum, iron, gallium, boron, titanium, vanadium, zirconium, molybdenum, arsenic, antimony, chromium and manganese. The zeolite of the invention is characterized in that it has an X/T ratio of between 5 and 50, preferably between 6 and 35, more preferably between 7 and 30, and even more preferably between 7 and 26 and in that it has an N/X ratio of between 0.010 and 0.065. The zeolite according to the invention is a new EUO-structural-type zeolite. It is differentiated from EU-1 and TPZ-3 zeolites in that it has, after synthesis, a lower N/X ratio, and it is differentiated from the ZSM-50 zeolite by its low X/T ratio. The invention also relates to the use of said zeolite as an element of a catalyst that is used in the processes for transformation of hydrocarbons and in particular in the processes for isomerization of C8-aromatic compounds.

ADVANTAGE OF THE INVENTION

The EUO-structural-type zeolite according to the invention that has low X/T and N/X ratios and that is used subsequently as a catalyst, combined with at least one binder, at least one metal that is selected from among the elements of group VIII, whereby said metal is preferably deposited on the binder, has improved catalytic performance levels in transformation of hydrocarbons in terms of activity, such as, for example, in isomerization of C8-aromatic compounds, i.e., mixtures that consist of xylenes and optionally ethylbenzene. In particular, it was discovered, surprisingly enough, that an EUO-structural-type zeolite that has an N/X ratio that is less than 0.065 and an X/T ratio that is less than 50 results in a more active and more selective catalyst than those with an EUO zeolite base that have an N/X ratio that is less than 0.065 and an Si/Al ratio that is greater than 50, a better activity and a better selectivity that make it possible to increase very considerably the desired yields of aromatic compounds. A catalyst with an EUO zeolite base according to the invention also makes it possible to limit the et losses constituted by the secondary products that are formed during parasitic reactions.

DESCRIPTION OF THE INVENTION

This invention relates to an EUO-structural-type zeolite that comprises at least one element X that is selected from among silicon and germanium and at least one element T that is selected from among aluminum, iron, gallium, boron, titanium, vanadium, zirconium, molybdenum, arsenic, antimony, chromium and manganese, whereby said zeolite is characterized in that it has an X/T ratio of between 5 and 50 and an N/X ratio of between 0.010 and 0.065.

The structure of the EUO zeolite according to the invention is identified by x-ray diffractometry. Its crystallinity is calculated from the diffraction diagram by comparison with a reference EUO zeolite. The crystallinity corresponds to the ratio of the surface area of the analyzed peaks of solids to the surface area of the peaks of the reference EUO zeolite, in the diffraction angle field 2θ=8 to 40°. The zeolite according to this invention has a diffraction diagram in accordance with that of the EUO-structural-type zeolites, and it has a crystallinity that is greater than 80%, preferably greater than 85% and even more preferably greater than 90%.

The chemical composition of the EUO zeolite according to the invention is determined by the typical techniques of elementary analyses. In particular, the contents of elements X and T, in particular in silicon and aluminum, are determined by x-ray fluorescence. The X/T ratio, in particular the Si/Al ratio, of the EUO-structural-type zeolite of the invention is between 5 and 50, preferably between 6 and 35, more preferably between 7 and 30, and even more preferably between 7 and 26.

The nitrogen content is determined by catharometric detection after combustion and reduction. The N/X ratio, in particular the N/Si ratio, of the EUO-structural-type zeolite of the invention is between 0.010 and 0.065, preferably between 0.015 and 0.055, and even more preferably between 0.020 and 0.045.

The organic cation that acts as structuring agent and that is present in the intracrystalline pores of the zeolite is identified by nuclear magnetic resonance spectroscopy of carbon 13 at the magic angle under crossed polarization.

The EUO zeolite according to the invention is obtained, for example, according to a synthesis method that comprises the mixture in aqueous medium of at least one source of at least one element X that is selected from among silicon and germanium, at least one source of at least one element T that is selected from among aluminum, iron, gallium, boron, titanium, vanadium, zirconium, molybdenum, arsenic, antimony, chromium and manganese, at least one nitrogen-containing organic compound Q or precursors corresponding to said organic compound Q and nuclei of at least one zeolitic material S of the same structural type as the EUO zeolite of the invention. The reaction of the mixture is maintained until the zeolite crystallizes.

Any nitrogen-containing organic compound Q that results in a crude synthesis zeolite that has an N/X ratio of between 0.010 and 0.065, preferably between 0.015 and 0.055 and even more preferably between 0.020 and 0.045, is suitable. Advantageously, the organic compound is the dibenzyldimethylammonium derivative or its precursors. The RMN$^{13}$C spectrum of the organic compound that is present in the intracrystalline pores of the EUO-structural-type zeolite of the invention corresponds, in this case, to that of the dibenzyldimethylammonium derivative.

Organic structuring agent Q can be a dibenzyldimethylammonium salt, such as, for example, halide, hydroxide, sulfate, silicate or aluminate.

The dibenzyldimethylammonium salts can also be obtained from precursors. Particularly suitable precursors are benzyldimethylamine and benzyl halide or benzyl alcohol. They can be used just as they are in situ or they can be preheated together in the reaction container, preferably in solution before the addition of the other reagents necessary for the synthesis of the EUO-structural-type zeolite.

The zeolitic materials that act as nuclei are at least in part, and preferably totally, of the same structural type as that of the EUO zeolite of the invention. Advantageously, the EUO-structural-type zeolitic nuclei have an X/T ratio of between 5 and 100, where X and T are defined as above. Very preferably, the zeolite of the invention is prepared with zeolitic nuclei that comprise the same elements X and T.

The X/T ratio of said nuclei is preferably between 5 and 50. More preferably, it is between 6 and 35, and even more preferably it is between 7 and 30. Very preferably, the nuclei have the same crystalline composition as that of the EUO zeolite that is to be prepared, i.e., they have the same Si/Al ratio as that of the zeolite that is prepared.

The zeolitic materials that act as nuclei can be introduced during synthesis of the zeolite that it is desired to synthesize under several forms. Thus, the nuclei can be introduced after having undergone at least one of the stages that is selected from among the following stages: washing, drying, calcination and ion exchange. The nuclei can also be introduced in the crude synthesis form.

The zeolitic materials that act as nuclei can be introduced at any time in the preparation of the zeolite that it is desired to synthesize. The nuclei can be introduced at the same time as the sources of elements X and T, organic structuring agent Q, or the nuclei can be introduced first into the aqueous mixture or else the nuclei can be introduced after the introduction of the sources of elements X and T and the structuring agent. The nuclei are preferably introduced after homogenization at least in part from the aqueous mixture that contains the sources of elements X and T and the structuring agent. The size of the particles of zeolitic nuclei can have an influence on the synthesis process, it is suitable for selecting the nuclei that have a particle size such that the synthesis conditions are optimum. Zeolitic nuclei particle is defined as either a zeolite crystal or an aggregate of zeolite crystals where an aggregate is a unit that is formed by at least two zeolite crystals that have at least one contact point between them. Thus, at least the majority (or at least 90% by volume) of the particles of nuclei that are introduced during the preparation of the EUO zeolite have a size of between 0.001 and 500 $\mu$m, preferably between 0.005 and 250 $\mu$m and even more preferably between 0.005 and 200 $\mu$m.

In a particular implementation that may or may not be independent of the preceding implementation, it is advantageous to add to the reaction medium at least one alkaline metal salt P. It is possible to cite, for example, strong acid radicals such as bromide, chloride, iodide, sulfate, phosphate or nitrate, or weak acid radicals such as organic acid radicals, for example citrate or acetate. This salt can accelerate the crystallization of the EUO-structural-type zeolite starting from the reaction mixture.

The reaction mixture that is used in the synthesis of the EUO-structural-type zeolite of the invention generally has the following composition, expressed in oxide form:

| | |
|---|---|
| $XO_2/T_2O_3$ (mol/mol) | 10–100 |
| $OH^-/XO_2$ (mol/mol) | 0.002 to 2.0 |
| $Q/XO_2$ (mol/mol) | 0.002 to 2.0 |
| $Q/(M^+ + Q)$ (mol/mol) | 0.1 to 1.0 |
| $H_2O/XO_2$ (mol/mol) | 1 to 500 |
| $P/XO_2$ (mol/mol) | 0 to 5 |
| $S/XO_2$ (g/g) | 0.0001 to 0.1 | preferably, the reaction mixture has the following composition, expressed in oxide form:

| | |
|---|---|
| $XO_2/T_2O_3$ (mol/mol) | 12–70 |
| $OH^-/XO_2$ (mol/mol) | 0.005 to 1.5 |
| $Q/XO_2$ (mol/mol) | 0.005 to 1.5 |
| $Q/(M^+ + Q)$ (mol/mol) | 0.1 to 1.0 |
| $H_2O/XO_2$ (mol/mol) | 3 to 250 |
| $P/XO_2$ (mol/mol) | 0 to 1 |
| $S/XO_2$ (g/g) | 0.0005 to 0.07 | and, even more preferably, the reaction mixture has the following composition, expressed in oxide form:

| | |
|---|---|
| $XO_2/T_2O_3$ (mol/mol) | 15–60 |
| $OH^-/XO_2$ (mol/mol) | 0.01 to 1 |
| $Q/XO_2$ (mol/mol) | 0.01 to 1 |
| $Q/(M^+ + Q)$ (mol/mol) | 0.1 to 1.0 |
| $H_2O/XO_2$ (mol/mol) | 5 to 100 |
| $P/XO_2$ (mol/mol) | 0 to 0.25 |
| $S/XO_2$ (g/g) | 0.001 to 0.04 | where

X is silicon and/or germanium,

T is at least one element that is selected from among aluminum, iron, gallium, boron, titanium, vanadium, zirconium, molybdenum, arsenic, antimony, chromium and manganese, M' represents an alkaline metal, Q represents the organic structuring agent or the precursors of said structuring agent, S represents the zeolite nuclei that are present in crude, dried, calcined or exchanged form, P represents the alkaline metal salt.

M and/or Q can be present in the form of hydroxides or salts of inorganic or orgnaic acids provided that the $OH^-/XO_2$ criterion is satisfied.

The preferred alkaline metal ($M^+$) is sodium. Preferred element X is silicon. Preferred element T is aluminum.

The silicon source can be any one of those whose use is usually considered for the synthesis of zeolites, for example powdered solid silica, silicic acid, colloidal silica or silica in solution. Among the powder silicas that can be used, it is suitable to cite the precipitated silicas, especially those that are obtained by precipitation starting from a solution of an alkaline metal silicate, such as the "Zeosil" or the "Tixosil," produced by Rhodia, the pyrogenated silicas such as the "Aerosil" produced by Degussa and the "Cabosil" produced by Cabot and the silica gels. Colloidal silicas of various grain sizes can be used, such as those sold under the filed trademarks "LUDOX" of Dupont and "SYTON" of Monsanto. The dissolved silicas that can be used are in particular soluble glasses or marketed silicates that contain: 0.5 to 6.0 and especially 2.0 to 4.0 mol of $SiO_2$ per mol of alkaline metal oxide and the silicates that are obtained by dissolution of silica in an alkaline metal hydroxide, a quaternary ammonium hydroxide or a mixture of the latter.

The aluminum source is most advantageously sodium aluminate, but it can also be aluminum, an aluminum salt, for example chloride, nitrate or sulfate, an aluminum alcoholate or the alumina itself, which is preferably in a hydrated or hydratable form such as colloidal alumina, pseuodoboehmite, boehmite, gamma-alumina or the trihydrates.

It is possible to use mixtures of the sources that are cited above. Combined sources of silicon and aluminum can also be used, such as the amorphous silica-aluminas or certain clays.

The reaction mixture is usually caused to react under autogenic pressure, optionally with the addition of a gas, for example nitrogen, at a temperature of between 85 and 250° C. until crystals of the zeolite form, which can last from 1 minute to several months according to the composition of the reagents, the method of heating and mixing, the working temperature and the stirring. The stirring is optional, but preferable, because it shortens the reaction time.

At the end of the reaction, the solid phase is collected on a filter and washed. In that stage, the EUO zeolite according to the invention is called raw straight from synthesis and contains in its intracrystalline pores the nitrogen-containing organic structuring agent, preferably the DBDMA cation. It is then ready for the following operations such as drying, calcination and ion exchange. The zeolite of the invention, after having been subjected to calcination, is freed of nitrogen-containing organic structuring agent, but its X/T ratio remains unchanged. Of course, in calcined form, the zeolite of the invention no longer contains nitrogen.

Thus, to obtain the hydrogen form of the EUO-structural-type zeolite, it is possible to carry out an ion exchange with an acid, especially a strong mineral acid such as hydrochloric acid, sulfuric acid or nitric acid, or with a compound such as ammonium chloride, ammonium sulfate or ammonium nitrate. The ion exchange can be carried out by dilution in one or more steps with the ion exchange solution. The zeolite can be calcined before or after the ion exchange or between two ion exchange stages, preferably before the ion exchange to eliminate any included organic substance to the extent that the ion exchange is facilitated.

Generally, the cation or cations of the EUO-structural-type zeolite can be replaced by one or more of any metal cations and in particular those of groups IA, IB, IIA, IIB, IIIA, IIIB (including the rare earths), VIII (including the noble metals), just as for lead, tin and bismuth (periodic table in "Handbook of Physics and Chemistry," 76th Edition). The exchange is carried out with any water-soluble salts that contain the suitable cation.

This invention also relates to the use of the zeolite of this invention as an acid solid for catalysis in the fields of refining and petrochemistry. Acid solid is defined as the zeolite that is in hydrogen form, i.e., that the crude synthesis zeolite was calcined and exchanged.

The zeolite of the invention can also be used as an adsorbent for the monitoring of pollution and as a molecular sieve for the separation. Advantageously, it is used as nuclei for the synthesis of zeolites of any structural type. When it is used as nuclei, it can be found both in its crude synthesis form and in its exchanged form.

For example, when the EUO zeolite of the invention is used as a catalyst, it is in calcined form, i.e., rid of nitrogen-containing structuring agent, and it can be combined with an inorganic matrix that can be inert or catalytically active and with a metallic phase.

The inorganic matrix can be present simply as a binder to keep together the small particles of the zeolite in the various known forms of catalysts (extrudates, pellets, balls, powders) or else can be added as a diluent for imposing the degree of conversion into a process that would otherwise proceed at too quick a rate, leading to fouling of the catalyst due to excessive coke formation.

Typical inorganic matrices are in particular substrate materials for the catalysts such as silica, various forms of alumina, magnesia, zirconia, titanium oxides, boron oxides, aluminum phosphates, titanium phosphates, zirconium phosphates, kaolinic clays, bentonites, montmorillonites, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$ or any combination of these compounds.

The EUO-structural-type zeolite of the invention can also be combined with at least one other zeolite and can act as main active phase or additive.

The inorganic matrix can be a mixture of various compounds, in particular an inert phase and an active phase.

The metallic phase is introduced into only the zeolite, only the inorganic matrix or the inorganic matrix-zeolite unit by ion exchange or impregnation with cations or oxides that are selected from among the cations or oxides of the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element of the periodic table.

The catalytic compositions that comprise the EUO-structural-type zeolite of the invention, in its calcined form, can be applied advantageously in the reactions of isomerization, transalkylation and dismutation, alkylation and dealkylation, hydration and dehydration, oligomerization and polymerization, cyclization, aromatization, cracking and hydrocracking, reforming, hydrogenation and dehydrogenation, oxidation, halogenation, amine syntheses, hydrodesulfurization and hydrodenitrification, catalytic elimination of nitrogen oxides, whereby said reactions comprise saturated and unsaturated aliphatic hydrocarbons, aromatic hydrocarbons, oxidized organic compounds and organic compounds that contain nitrogen and/or sulfur, as well as organic compounds that contain other functional groups.

When said EUO zeolite is used as an acid solid in catalytic reactions, the catalyst contains:

at least one EUO-structural-type zeolite of the invention, in its calcined form, that has an X/T ratio of between 5 and 50, preferably between 6 and 35, more preferably between 7 and 30, and even more preferably between 7 and 26, at least one metal of group VIII, preferably selected from the group that consists of palladium and platinum and even preferably platinum, at least one binder, preferably alumina, optionally at least one element that belongs to the group that is formed by the elements of groups IB, IIB, IIIA, IVA, VIB and VIIB, preferably selected from the group that is formed by tin and indium, optionally sulfur.

More specifically and relative to the weight of the catalyst, the catalyst generally comprises:

1 to 90% inclusive, preferably 3 to 75% inclusive, and even more preferably 4 to 60% inclusive, by weight, of at least one EUO-structural-type zeolite of this invention, in its calcined form, comprising at least one element X that is selected from among germanium and silicon and at least one element T that is selected from the group that is formed by aluminum, iron, gallium, boron, titanium, vanadium, zirconium, molybdenum, arsenic, antimony, chromium and manganese, preferably aluminum and boron, whose atomic ratio X/T is between 5 and 50, preferably between 6 and 35, more preferably between 7 and 30 and even more preferably between 7 and 26, whereby said zeolite comes at least in part in acid form, i.e., in hydrogen H form, 0.01 to 10% inclusive, preferably 0.01 to 2% inclusive, and even more preferably 0.05 to 1.0% inclusive by weight, of at least one metal of group VIII of the periodic table, preferably selected from the group that is formed by platinum and palladium and even more preferably platinum, optionally 0.01 to 10% inclusive, preferably 0.01 to 2% inclusive, and even more preferably between 0.05 and 1.0% inclusive, by weight, of at least one element of the group that is formed by groups IB, IIB, IIIA, IVA, VIB, and VIIB of the periodic table, preferably selected from the group that is formed by tin and indium, optionally sulfur, whose content is such that the ratio of the number of sulfur atoms to the number of metal atoms of group VIII that are deposited is between 0.5 and 2 inclusive, the make-up to 100% by weight of at least one binder, preferably alumina.

Any shaping method is suitable for this catalyst. It is possible to use, for example, pelletizing, extrusion or the shaping of balls. The shaping of the catalyst according to the invention is generally such that the catalyst is preferably in the form of extrudates or balls with a view to its use.

The EUO-structural-type zeolite of this invention is treated by at least one calcination stage, then subjected to at least one ion exchange in at least one $NH_4NO_3$ solution to obtain a zeolite whose content of residual alkaline element A, for example sodium, is more or less significant.

The EUO-structural-type zeolite of this invention, in its calcined form, included in the catalyst according to the invention, is at least partly, preferably virtually completely, in acid form, i.e., in hydrogen form (H'), whereby the content of alkaline element, for example sodium, is preferably such that the A/T atomic ratio is less than 0.5, preferably less than 0.1, even more preferably less than 0.02.

The binder (or matrix) in the catalyst that is used in this invention generally consists of at least one element that is selected from the group that is formed by clays, magnesia, aluminas, silicas, titanium oxide, boron oxide, zirconia, aluminum phosphates, titanium phosphates, zirconium phosphates and silica-aluminas. The binder is preferably an alumina.

The metals can be introduced either all the same way or by different techniques, at any time of the preparation, before or after shaping and in any order. In addition, intermediate treatments, such as, for example, a calcination and/or a reduction, can be applied between the depositions of various metals.

The preparation of the catalyst can be carried out by any method that is known to one skilled in the art. At least one element of group VIII is introduced into the zeolite or in the binder, preferably in the binder before or after shaping.

A preferred method consists in producing a mixture of the matrix and the zeolite followed by a shaping. The shaping is generally followed by a calcination, generally at a temperature of between 250° C. and 600° C., inclusive. At least one element of group VIII of the periodic table is introduced after this calcination, preferably by selective deposition on the binder. Said elements are deposited virtually at more than 90% inclusive entirely on the binder in a manner that is known to one skilled in the art by monitoring the parameters that are used during said deposition, such as, for example, the nature of the precursor that is used for carrying out said deposition.

At least one element of group VIII is deposited preferably in the EUO-binder zeolite mixture first shaped by any process that is known to one skilled in the art. Such a deposition is carried out, for example, by the dry impregnation technique, impregnation by excess or ion exchange. All of the precursors are suitable for the deposition of these elements. Preferably, an anion exchange will be used with the hexachloroplatinic acid and/or the hexachloropalladic acid in the presence of a competing agent, for example hydrochloric acid. In this case, the metal is virtually entirely deposited at more than 90% on the binder, and it has good dispersion and good macroscopic distribution through the catalyst grain which constitutes a preferred method for preparation.

Another preferred method for preparation of the catalyst, used in this invention, consists in kneading the EUO-zeolite, in its calcined form, in a moist matrix gel (generally obtained by mixing at least one acid and a matrix powder), for example, alumina, for a period that is necessary for obtaining good homogeneity of the paste that is thus obtained, or, for example, for about 10 minutes, then in passing the paste through a die to form extrudates. Then, after drying, for example for several hours at about 120° C. in a drying oven and after calcination, for example for two hours at about 500° C., at least one element, for example platinum, is deposited, for example by anion exchange with the hexachloroplatinic acid in the presence of a competing agent (for example hydrochloric acid), whereby said deposition is followed by calcination for example for about 2 hours at about 500° C.

Optionally, at least one other element that is selected from the group that is formed by the elements of groups IB, IIB, IIIA, IVA, VIB and VIIB is added. It is possible to add the elements of group VIII and groups IB, IIB, IIIA, IVA, VIB and VIIB either separately at any stage of the preparation of said catalyst or simultaneously in at least one unit stage. When at least one element of groups IB, IIB, IIIA, IVA, VIB and VIIB is added separately, it is preferable that it be added first to the element of group VIII. All of the deposition techniques that are known to one skilled in the art and all of the precursors are suitable.

The platinum is generally introduced into the matrix in the form of hexachloroplatinic acid, but for any noble metal, ammoniated compounds with, in this case deposition of the noble metal in the zeolite, can also be used or compounds such as, for example, ammonium chloroplatinate, dicarbonyl platinum dichloride, hexahydroxyplatinic acid, palladium chloride, and palladium nitrate can be used.

In the case of platinum, it is also possible to cite, for example, tetraamine platinum II salts of formula $Pt/(NH_3)_4 X_2$; hexamine platinum IV salts of formula $Pt(NH_3)_6X_4$; the halogenopentamine platinum IV salts of formula $(PtX(NH_3)_5)X_3$; the tetrahalogenodiamine platinum IV salts of formula $PtX_4(NH_3)_2$; the platinum complexes with the halogen-polyketones and the halogenated compounds of formula $H(Pt(acac)_2X)$; whereby X is a halogen that is selected from the group that is formed by chlorine, fluorine, bromine and iodine, and whereby X is preferably chlorine and acac represents the group $C_5H_7O_2$ that is derived from acetylacetone.

The introduction of the noble metal of the platinum family is preferably carried out by impregnation with an aqueous or organic solution of one of the organometallic compounds that are cited above. Among the organic solvents that can be used, it is possible to cite the paraffinic, naphthenic or aromatic hydrocarbons that contain 4 to 12 carbon atoms, and the halogenated organic compounds that have, for example, 1 to 12 carbon atoms per molecule. It is possible to cite, for example, the n-heptane, methylcyclohexane, toluene and chloroform. It is also possible to use the mixtures of solvents.

The additional element, optionally introduced and selected from the group that is formed by the elements of groups IB, IIB, IIIA, IVA, VIB and VIIB, can be introduced by compounds such as, for example, chlorides, bromides and nitrates, alkyls of elements of groups IB, IIB, IIIA, IVA, VIB and VIIB, or, for example, in the case of tin and indium, alkyl-tin, nitrate and indium chloride.

This element can also be introduced in the form of at least one organic compound that is selected from the group that consists of the complexes of said element, in particular the polyketonic complexes of the metal and hydrocarbyl metals, such as the alkyls, cycloalkyls, aryls, and metal alkylaryls. In the latter case, the introduction of the metal is advantageously carried out with a solution of the organometallic compound of said metal in an organic solvent. It is also possible to use organohalogenated compounds of the metal. As compounds of the metal, it is possible to cite in particular the tetrabutyltin in the case of tin, and the triphenylindium in the case of indium.

The impregnation solvent is selected from the group that consists of the paraffinic, naphthenic or aromatic hydrocarbons that contain 4 to 12 carbon atoms per molecule and the halogenated organic compounds that contain 1 to 12 carbon atoms per molecule. It is possible to cite, for example, the n-heptane, methylcyclohexane and the chloroform. It is also possible to use mixtures of the solvents that are defined above.

The additional metal can optionally be introduced at any time of the preparation, preferably prior to the deposition of one or more metals of group VIII. If this metal is introduced before the noble metal, the compound of the metal that is used is generally selected from the group that consists of halide, nitrate, acetate, tartrate, carbonate and oxalate of metal. The introduction is then advantageously carried out in aqueous solution. It is also possible, however, to be introduced with a solution of an organometallic compound of the metal, for example, tetrabutyltin. In this case, before initiating the introduction of at least one noble metal, calcination under air is initiated.

The preparation of the catalyst generally comprises calcination, usually at a temperature of between about 250° C. and 600° C. inclusive, for a period of about 0.5 to 10 hours, preferably preceded by drying, for example in a drying oven, at a temperature of between the ambient temperature and 250° C., preferably between 40 and 200° C. Said drying stage is preferably conducted during the rise in temperature that is necessary for carrying out said calcination.

In the case where the catalyst of this invention contains sulfur, the sulfur is introduced in the calcined, shaped catalyst that contains the metal or metals cited above, either in-situ before the catalytic reaction or ex-situ. The optional sulfurization occurs after the reduction. In the case of a sulfurization in situ, the reduction, if the catalyst was not first reduced, occurs before the sulfurization. In the case of a sulfurization ex-situ, the reduction and then the sulfurization are carried out. The sulfurization is carried out in the presence of hydrogen by using any sulfurizing agent that is well known to one skilled in the art, such as, for example, the dimethyl sulfide or the hydrogen sulfide. For example, the catalyst is treated with a feedstock that contains dimethyl sulfide in the presence of hydrogen, with a concentration such that the sulfur/metal atomic ratio is 1.5. The catalyst is then kept for about 3 hours at about 400° C. under hydrogen flow before the feedstock is injected.

The catalyst with an EUO zeolite base of the invention is very advantageously used in the reactions for isomerization of a C8-aromatic fraction that comprises, for example, either a mixture of xylene(s) or ethylbenzene, or a mixture of xylene(s) and ethylbenzene. Said process is generally used according to the following operating conditions:

- a temperature of between 300° C. and 500° C. inclusive, preferably between 320° C. and 450° C. inclusive and even more preferably between 340° C. and 430° C. inclusive,
- a partial hydrogen pressure of between 0.3 and 1.5 MPa inclusive, preferably between 0.4 and 1.2 MPa inclusive and even more preferably between 0.6 and 1.2 MPa inclusive,
- a total pressure of between 0.45 and 1.9 MPa inclusive, preferably between 0.6 and 1.5 MPa inclusive,
- a feed volumetric flow rate, expressed in kilograms of feedstock that is introduced per kilogram of catalyst and per hour, between 0.25 and 30 $h^{-1}$ inclusive, preferably between 1 and 25 $h^{-1}$ inclusive, and even more preferably between 2 and 15 $h^{1h}$-1 inclusive.

The invention is illustrated by the following examples.

EXAMPLE 1

For Comparison

Synthesis of an EUO zeolite with an Si/Al ratio that is equal to 56 and an N/Si ratio that is equal to 0.028, according to the prior art.

The synthesis conditions are defined in Table 1.

Solution A that consists of silicon and structuring agent precursors is prepared by diluting 3.530 g of benzyldimethylamine (Lancaster, 98%) and 3.260 g of benzyl chloride (Fluka, 99%) in 42.92 g of water then by adding 38.45 g of the colloidal silica sol (Ludox HS40, Dupont, 40% $SiO2$). Then, 0.610 g of solid sodium hydroxide (Prolabo, 99%) and 0.496 g of solid sodium aluminate (Prolabo, 46% $Al2O3$, 33% $Na2O$) are dissolved in 5.36 g of water to form solution B. Solution B is added into solution A while being stirred, then 5.36 g of water is added. It is mixed until homogenization occurs. The mixture that results in an autoclave of 125 ml while being stirred is reacted for 3 days at 180° C. under autogenic pressure. After cooling, the product is filtered, it is washed with 100 ml of demineralized water, and then it is dried in a ventilated drying oven at 120° C.

TABLE 1

| Synthesis Conditions | |
|---|---|
| Formulation of the Gel | |
| $SiO2$ (mol) | 60 |
| $Al2O3$ (mol) | 0.52 |
| $Na2O$ (mol) | 3 |
| BDMA (mol) | 6 |
| BCl (mol) | 6 |
| $H2O$ (mol) | 1000 |
| Crystallization Conditions | |
| Temperature (° C.) | 180 |
| Length of time (day) | 3 |

BDMA = benzyldimethylamine
BCl = benzyl chloride

The results of the x-ray diffraction, chemical analysis and spectroscopy by nuclear magnetic resonance of carbon 13 at the magic angle under crossed polarization are recorded in Table 2. The solid that is obtained is a pure EUO zeolite, with reference crystallinity, an Si/Al ratio of 56, an N/Si ratio of 0.028 and that contains the cation DBDMA in its intracrystalline pores.

TABLE 2

| Characteristics of the Solid that is Obtained | |
|---|---|
| X-Ray Diffraction | |
| Phase Identification | EUO |
| Crystallinity (%) | 100 (reference) |
| Chemical Analyses | |
| $SiO_2$ (% by weight) | 84.8 |
| Al2O3 (% by weight) | 1.29 |
| Na2O (% by weight) | 0.17 |

TABLE 2-continued

Characteristics of the Solid that is Obtained

| | |
|---|---|
| N (% by weight) | 0.56 |
| PAF (% by weight) | 13.5 |
| Si/Al (mol/mol) | 56 |
| N/Si (mol/mol) | 0.028 |
| Nuclear Magnetic Resonance Spectroscopy of Carbon 13 at the Magic Angle under Crossed Polarization | |
| Identification of the Organic Compound Included in the Zeolite | DBDMA |
| δ-CH3 (ppm) | 47.5 |
| δ-CH2 (ppm) | 72.9 |
| δ-C-aromatic compounds (ppm) | 130 (solid mass) |

PAF = loss due to fire
δ = chemical shift of the different radicals of the organic compo This crude synthesis EUO zeolite that contains DBDMA with an N/Si ratio of 0.028 and an Si/Al ratio that is greater than 50 corresponds to the ZSM-50 zeolite of the prior art. It represents the reference for the catalytic analyses and evaluations.

EXAMPLE 2

For Comparison

EUO zeolite with an Si/Al ratio that is equal to 25, an N/Si ratio that is equal to 0.08 synthesized with the hexamethylammonium cation as an organic structuring agent, according to the prior art.

The EUO zeolite that has Si/Al and N/Si ratios as defined above is synthesized with the hexamethonium bromide (HM, 1,6 trimethylammonium-hexane) according to the conditions that are described by J. L. Casci et al. in Example 3 of Patent EP-A-0 042 226.

The results of X-ray diffraction and chemical analysis are recorded in Table 3. The solid that is obtained is a pure EUO zeolite with a crystallinity of 95%, an Si/Al ratio of 25, and an N/Si ratio of 0.074.

TABLE 3

Characteristics of the Solid that is Obtained

| | |
|---|---|
| X-Ray Diffraction | |
| Phase Identification | EUO |
| Crystallinity (%) | 95 |
| Chemical Analyses | |
| SiO2 (% by weight) | 81.0 |
| Al2O3 (% by weight) | 2.75 |
| Na2O (% by weight) | 0.47 |
| N (% by weight) | 1.40 |
| PAF (% by weight) | 15.0 |
| Si/Al (mol/mol) | 25 |
| N/Si (mol/mol) | 0.074 |

PAF = chemical shift

This zeolite with an Si/Al ratio of 25 that is prepared with HM according to the prior art and that has an N/Si ratio that is greater than 0.065 corresponds to the EU-1 zeolite. It is used as nuclei for the synthesis of the EUO zeolite according to the invention.

EXAMPLE 3

Invention

Synthesis of an EUO Zeolite with an Si/Al Ratio that is Equal to 26 and an N/Si Ratio that is Equal to 0.031

The synthesis conditions are defined in Table 4.

Solution A that consists of silicon and precursors of structuring agent is prepared by diluting 3.530 g of benzyldimethylamine (Lancaster, 98%) and 3.260 g of benzyl chloride (Lancaster, 99%) in 42.79 g of water by adding 38.37 g of colloidal silica sol (Ludox HS40, Dupont, 40% SiO2). Then, 0.418 g of solid sodium hydroxide (Prolabo, 99%) and 0.945 g of solid sodium aluminate (Prolabo, 46% Al2O3, 33% Na2O) are dissolved in 5.35 g of water to form solution B. Solution B is added to solution A while being stirred, and then 5.35 g of water is added. It is mixed until homogenization occurs. Finally, 0.616 g of EUO zeolite nuclei, post synthesis, containing sodium and the hexamethonium cation, prepared according to the conditions of Example 2, is added. The resulting mixture is reacted in a 125 ml autoclave while being stirred for 9 days at 180° C. under autogenic pressure. After cooling, the product is filtered, and it is washed with 100 ml of demineralized water, then it is dried in a ventilated drying oven at 120° C.

TABLE 4

Synthesis Conditions

| | |
|---|---|
| Formulation of the Gel | |
| SiO2 (mol) | 60 |
| Al2O3 (mol) | 1 |
| Na2O (mol) | 3 |
| BDMA (mol) | 6 |
| BCl (mol) | 6 |
| H2O (mol) | 1000 |
| EUO/SiO2 (g/g) | 0.04 |
| Crystallization conditions | |
| Temperature (° C.) | 180 |
| Length of time (day) | 9 |

BDMA = benzyldimethylamine
BCl = benzyl chloride

The results of x-ray diffraction, chemical analysis and spectroscopy by nuclear magnetic resonance of carbon 13 at the magic angle under crossed polarization are recorded in Table 5. The solid that is obtained is a pure EUO zeolite with crystallinity of 95% relative to the reference, an Si/Al ratio of 26, and an N/Si ratio of 0.031, and it contains the cation DBDMA in its intracrystalline pores.

TABLE 5

Characteristics of the Solid that is Obtained

| | |
|---|---|
| X-Ray Diffraction | |
| Phase Identification | EUO |
| Crystallinity (%) | 95 |
| Chemical Analyses (Contents by Weight) | |
| SiO2 (% by weight) | 82.2 |
| Al2O3 (% by weight) | 2.69 |
| Na2O (% by weight) | 0.54 |
| N (% by weight) | 0.59 |
| PAF (% by weight) | 14.3 |
| Si/Al (mol/mol) | 26 |
| N/Si (mol/mol) | 0.031 |
| Nuclear Magnetic Resonance Spectroscopy of Carbon 13 at the Magic Angle under Crossed Polarization (Chemical Shifts) | |
| Identification of the Organic Compound Included in the Zeolite | DBDMA |
| δ-CH3 (ppm) | 48.0 |

TABLE 5-continued

Characteristics of the Solid that is Obtained

| | |
|---|---|
| δ-CH2 (ppm) | 74.1 |
| δ-C-aromatic compounds (ppm) | 130 (solid mass) |

PAF = loss due to fire
δ = chemical shift of the different radicals of the organic compound

EXAMPLE 4

For Comparison

Preparation of catalyst A not in accordance with the invention.

The first raw material used is the crude synthesis EUO zeolite of Example 1 that comprises DBDMA and that has an overall Si/Al atomic ratio that is equal to 56 and an N/Si ratio that is equal to 0.028 and with an Na2O content by weight relative to the weight of dry EU-1 zeolite of 0.17%.

This EUO zeolite first undergoes a so-called dry calcination at 550° C. under air flow for 6 hours. Then, the solid that is obtained is subjected to three ion exchanges in a 10N NH$_4$NO$_3$ solution, at about 100° C. for 4 hours for each exchange.

At the end of these treatments, the EUO zeolite in NH$_4$ form has an overall atomic Si/Al ratio that is equal to 56, a content by weight of sodium relative to the dry EUO zeolite weight of 55 ppm. The zeolite is again dried then calcined to obtain the H form.

Catalyst A is obtained by mixing the EUO zeolite and an alumina on which 0.33% by weight of platinum was first deposited, whereby the two components are in the form of a powder with a grain size of between 125 and 315 µm.

The platinum is deposited on this extruded alumina by anionic exchange with hexachloroplatinic acid in the presence of a competing agent (hydrochloric acid). The moist alumina is then dried at 120° C. for 12 hours and calcined under dry air flow at the temperature of 500° C. for one hour. The metallic phase has a dispersion of 99% measured by oxygen chemisorption. The alumina is then ground.

Catalyst A consists of contents by weight of 60% of EUO zeolite in hydrogen form that has an Si/Al ratio of 56, 39.87% of alumina and 0.13% of platinum.

EXAMPLE 5

According to the Invention

Preparation of Catalyst B According to the Invention

The raw material used is the crude synthesis EUO zeolite of Example 3 that comprises DBDMA and that has an overall Si/Al atomic ratio that is equal to 26, an N/Si ratio that is equal to 0.031 and a content by weight of Na$_2$O relative to the weight of dry EU-1 zeolite of 0.54%.

This EUO zeolite first undergoes a so-called dry calcination at 550° C. under air flow for 6 hours. Then, the solid that is obtained is subjected to three ion exchanges in a 10N NH$_4$NO$_3$ solution at about 100° C. for 4 hours for each exchange.

At the end of these treatments, the EUO zeolite in NH$_4$ form has an overall atomic Si/Al ratio that is equal to 26, a content by weight of sodium relative to the weight of dry EUO zeolite of 60 ppm. The zeolite is again dried then calcined to obtain the H form.

Catalyst B is obtained by mixing the EUO zeolite and an alumina on which 0.33% by weight of platinum (the same as the one used in the preceding example) was previously deposited, whereby the two components are in the form of a powder with a grain size of between 125 and 315 µm.

Catalyst B consists of contents by weight of 10% of EUO zeolite in hydrogen form that has an Si/Al ratio of 26, 89.7% of alumina and 0.3% of platinum.

EXAMPLE 6

Evaluation of the Catalytic Properties of Catalysts A and B in Isomerization of a C8-Aromatic Fraction The performance levels of catalysts A and B were evaluated in the isomerization of a C8-aromatic fraction that mainly contains meta-xylene, ortho-xylene and ethylbenzene on 5 g of powdered catalyst. The operating conditions are as follows:

temperature: 390° C., total pressure: 15 bar, (1 bar=0.1 MPa)

partial hydrogen pressure: 12 bar.

The catalysts are first treated with a feedstock that contains dimethyl disulfide (DMDS) in the presence of hydrogen with a concentration such that the sulfur/metal atomic ratio is 1.5. The catalyst is then maintained for 3 hours at 400° C. under a hydrogen flow, then the feedstock is injected.

The catalysts were compared in terms of activity (by paraxylene equilibrium approaches and by the conversions of the ethylbenzene) and in terms of selectivity by the iso-approach net losses at the equilibrium of paraxylene.

To calculate equilibrium approaches (AEQ), the paraxylene concentrations (% pX) are expressed relative to the three xylene isomers.

Equilibrium approaches (AEQ) are defined in the following manner:

$$pX\,AEQ\,(\%) = 100 \times (\%\,pX_{effluent} - \%\,pX_{feedstock})/(\%\,pX_{equilibrium} - \%\,pX_{feedstock})$$

Cracking losses (P1) are losses of AC8 in the form of paraffins (PAR) of C1 to C8:

$$P1\,(\%\,by\,weight) = 100 \times [(\%\,PAR_{effluent} \times weight\,of\,effluent) - (\%\,PAR_{feedstock} \times weight\,of\,feedstock)]/(\%\,AC8_{feedstock} \times weight\,of\,feedstock)$$

Losses by dismutation/transalkylation (P2) are AC8 losses in the form of naphthenes other than N8, toluene, benzene and C9+aromatic compounds (OAN):

$$P2\,(\%\,by\,weight) = 100 \times [(\%\,OAN_{effluent} \times weight\,of\,effluent) - (\%\,OAN_{feedstock} \times weight\,of\,feedstock)]/(\%\,AC8_{feedstock} \times weight\,of\,feedstock)$$

The sum of losses P1 and P2 represents the net losses.

The evaluation of the two catalysts described lead to the results that are presented in Table 6.

TABLE 6

| Catalyst | A (Anamalous) | B (Consistent) |
|---|---|---|
| PX AEQ (%) | 90.7 | 90.5 |
| EB Conversion (%) | 39.3 | 40.1 |
| Net Losses (% by weight) | 4.55 | 3.36 |

According to the results of Table 6, it is noted that catalyst B according to the invention is much more active than unlike catalyst A, since it results in operating iso-conditions at a pX AEQ that is equal to the one that is obtained for catalyst A but for a significantly smaller zeolite content and with a slight increase of pph. Catalyst B is also more active in conversion of the ethylbenzene.

In addition, these results show that the EUO zeolite that is synthesized according to the process of the invention is more selective with a gain of 26% over the net losses in the isomerization reaction of aromatic compounds with 8 carbon atoms.

What is claimed is:

1. An EUO zeolite comprising nitrogen N, at least one element X selected from the group consisting of silicon and germanium, and at least one element T selected from the group consisting of aluminum, iron, gallium, boron, titanium, vanadium, zirconium, molybdenum, arsenic, antimony, chromium and manganese, said zeolite having an X/T ratio of between 5 and 50 and an N/X ratio of between 0.010 and 0.065.

2. A zeolite according to claim 1, having an X/T ratio of between 6 and 35.

3. A zeolite according to claim 2, having an N/X ratio of between 0.015 and 0.055.

4. A zeolite according to claim 3, wherein element X is silicon and element T is aluminum.

5. A zeolite according to claim 2, having an N/X ratio of between 0.020 and 0.045.

6. A zeolite according to claim 5, wherein element X is silicon and element T is aluminum.

7. A zeolite according to claim 1, having an X/T ratio of between 7 and 30.

8. A zeolite according to claim 1, having an X/T ratio of between 7 and 26.

9. A zeolite according to claim 8, having an N/X ratio of between 0.015 and 0.055.

10. A zeolite according to claim 9, wherein element X is silicon and element T is aluminum.

11. A zeolite according to claim 8, having an N/X ratio of between 0.020 and 0.045.

12. A zeolite according to claim 11, wherein element X is silicon and element T is aluminum.

13. A zeolite obtained by calcination of a zeolite according to claim 12.

14. A catalyst comprising a zeolite according to claim 13.

15. In a process comprising conducting a reaction in contact with a catalyst, the improvement wherein said catalyst comprises a catalyst in accordance with claim 24, said reaction being any of isomerization, transalkylation and dismutation, alkylation and dealkylation, hydration and dehydration, oligomerization and polymerization, cyclization, aromatization, cracking and hydrocracking, reforming, hydrogenation and dehydrogenation, oxidation, halogenation, amine syntheses, hydrodesulfurization and hydrodenitrification, catalytic elimination of nitrogen oxides.

16. A zeolite according to claim 1, having an N/X of between 0.015 and 0.055.

17. A zeolite according to claim 1, having an N/X ratio of between 0.020 and 0.045.

18. A zeolite according to claim 1, containing intra crystalline pores and within said pores dibenzyldimethylammonium cations.

19. A zeolite obtained by calcination of a zeolite according to claim 18.

20. A catalyst comprising a zeolite according to claim 19.

21. In a process comprising conducting a reaction in contact with a catalyst, the improvement wherein said catalyst comprises a catalyst in accordance with claim 20, said reaction being any of isomerization, transalkylation and dismutation, alkylation and dealkylation, hydration and dehydration, oligomerization and polymerization, cyclization, aromatization, cracking and hydrocracking, reforming, hydrogenation and dehydrogenation, oxidation, halogenation, amine syntheses, hydrodesulfurization and hydrodenitrification, catalytic elimination of nitrogen oxides.

22. A zeolite according to claim 1, wherein element X is silicon and element T is aluminum.

23. A zeolite obtained by calcination of a zeolite according to claim 1.

24. A catalyst comprising a zeolite according to claim 23.

25. In a process comprising conducting a reaction in contact with a catalyst, the improvement wherein said catalyst comprises a catalyst in accordance with claim 24, said reaction being any of isomerization, transalkylation and dismutation, alkylation and dealkylation, hydration and dehydration, oligomerization and polymerization, cyclization, aromatization, cracking and hydrocracking, reforming, hydrogenation and dehydrogenation, oxidation, halogenation, amine syntheses, hydrodesulfurization and hydrodenitrification, catalytic elimination of nitrogen oxides.

26. A process according to claim 25, wherein said zeolite, prior to calcination, contained intra crystalline pores and within said pores dibenzyldimethylammonium cations.

27. In the synthesis of zeolites comprising modifying a precursor zeolite to obtain a different zeolite, the improvement wherein said precursor zeolite is a zeolite according to claim 1.

28. In a process of producing the zeolite of claim 1, the zeolite is prepared using a structuring agent comprising a dibenzyldimethylammonium compound as a structuring agent.

* * * * *

UNITED STATES PATENT AND TRADEMARK OFFICE
CERTIFICATE OF CORRECTION

PATENT NO. : 6,723,301 B2 Page 1 of 1
DATED : April 20, 2004
INVENTOR(S) : Rouleau et al.

It is certified that error appears in the above-identified patent and that said Letters Patent is hereby corrected as shown below:

<u>Column 17,</u>
Line 44, "claim 24" should be -- claim 14 --.

Signed and Sealed this

Twenty-second Day of March, 2005

JON W. DUDAS
*Director of the United States Patent and Trademark Office*